(12) United States Patent
Kah (10) Patent No.: US 10,274,103 B2
(45) Date of Patent: Apr. 30, 2019

(54) ELECTRO-PNEUMATIC ACTUATOR (71) Applicant: Samson Aktiengesellschaft, Frankfurt am Main (DE)

(72) Inventor: Harald Kah, Brechen (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 202 days.

(21) Appl. No.: 15/172,675

(22) Filed: Jun. 3, 2016

(65) Prior Publication Data
US 2016/0356396 A1 Dec. 8, 2016

(30) Foreign Application Priority Data

Jun. 3, 2015 (DE) .................. 10 2015 007 147

(51) Int. Cl.
| F16K 37/00 | (2006.01) |
| F16K 31/42 | (2006.01) |
| F15B 5/00 | (2006.01) |
| F15B 19/00 | (2006.01) |
| F15B 20/00 | (2006.01) |

(52) U.S. Cl.
CPC .......... *F16K 37/0066* (2013.01); *F15B 5/006* (2013.01); *F15B 19/005* (2013.01); *F15B 20/00* (2013.01); *F16K 31/42* (2013.01); *F15B 2211/857* (2013.01); *F15B 2211/87* (2013.01); *Y02P 80/12* (2015.11); *Y10T 137/8158* (2015.04)

(58) Field of Classification Search
CPC ...... F16K 31/42; F16K 37/0066; F15B 5/006; F15B 19/005; F15B 20/00; F15B 2211/857; F15B 2211/87; Y10T 137/8158
USPC .................................................. 137/557, 551
See application file for complete search history.

(56) References Cited

U.S. PATENT DOCUMENTS

| 6,581,619 B1 | 6/2003 | Christiani et al. |
| 7,658,200 B2 * | 2/2010 | Choi ................. H01L 21/67126 137/14 |
| 8,310,088 B2 | 11/2012 | Kah et al. |

(Continued)

FOREIGN PATENT DOCUMENTS

| DE | 196 36 418 A1 | 3/1998 |
| DE | 19942509 A1 | 4/2001 |

(Continued)

*Primary Examiner* — Robert K Arundale
*Assistant Examiner* — Jonathan J Waddy
(74) *Attorney, Agent, or Firm* — Schiff Hardin LLP (57) ABSTRACT

An electro-pneumatic actuator, such as a positioner or an I/P transducer array, for a field device of a processing plant, such as a brewery, a petrochemical plant or the like, can include a pneumatically operated display configured to visually and/or acoustically display at least one field device-specific operating information. The information can include a drive or valve position, or a regulating variable. The electro-pneumatic actuator can be configured to output at least one pneumatic drive actuating signal to a pneumatic drive so as to set a final controlling device, such as a control valve, of the field device. The electro-pneumatic actuator can be configured to output at least one pneumatic display actuating signal to the pneumatically operated display, which can differ from the pneumatic drive actuating signal.

20 Claims, 2 Drawing Sheets

(56) References Cited

U.S. PATENT DOCUMENTS

| | | | |
|---|---|---|---|
| 2003/0208305 A1* | 11/2003 | Junk | F15B 13/0402 |
| | | | 700/282 |
| 2008/0163936 A1* | 7/2008 | Boger | F15B 5/006 |
| | | | 137/455 |
| 2010/0006790 A1* | 1/2010 | Tabelander | F15B 19/005 |
| | | | 251/129.04 |
| 2011/0001070 A1* | 1/2011 | Wilke | F16K 31/1262 |
| | | | 251/129.03 |
| 2013/0323088 A1* | 12/2013 | Medow | F15B 19/002 |
| | | | 417/63 |
| 2014/0116241 A1 | 5/2014 | Valentin-Rumpel | |
| 2014/0117263 A1 | 5/2014 | Valentin-Rumpel | |
| 2015/0261225 A1* | 9/2015 | Murata | G05B 11/01 |
| | | | 700/282 |
| 2016/0062368 A1* | 3/2016 | Wagner-Stuerz | G05B 15/02 |
| | | | 700/282 |

FOREIGN PATENT DOCUMENTS

| | | |
|---|---|---|
| DE | 102008062815 A1 | 6/2010 |
| DE | 102012021387 B3 | 2/2014 |
| DE | 102012021388 A1 | 4/2014 |

\* cited by examiner

ELECTRO-PNEUMATIC ACTUATOR

CROSS REFERENCE TO RELATED APPLICATIONS

This patent application claims priority to German Patent Application No. 102015007147.5, filed Jun. 3, 2015, which is incorporated herein by reference in its entirety.

BACKGROUND

The disclosure is directed to an electro-pneumatic actuator, such as a positioner or an I/P transducer array, for a field device of a processing plant, such as a brewery, a petrochemical plant or the like. Such an electro-pneumatic actuator is generally designed to output a pneumatic drive actuating signal to a pneumatic drive, so as to set a final controlling device, such as a control valve, of the field device. The electro-pneumatic actuator can include a pneumatically operated display for displaying at least one field device-specific operating information.

For example, one such known display takes the form of a pneumatically actuated indicator for visually displaying the position of a pneumatically actuated valve, which is used for opening or closing a fluid line. The valve has a pneumatic drive with a working chamber, which can be exposed to a drive pressure that counteracts a spring preload, so as to move a drive piston for actuating the valve. The visual indicator is screwed into a thread in the drive piston of the drive, so as to track the movement of the drive piston. The visual indicator visually displays whether the pneumatic drive has been exposed to the drive pressure or not.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. For the sake of better readability, similar or identical components of the exemplary embodiments are provided with the same or similar reference numbers below

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to provide an electro-pneumatic actuator that exhibits a pneumatically operated display that can display freely selectable operating information.

In an exemplary embodiment, an electro-pneumatic actuator, for example which can exhibit a current-pressure transducer or a positioner with a current-pressure transducer provided with a microcomputer, can include at least one pneumatically operated display for visually and/or acoustically displaying at least one field device-specific operating information. For example, a visual display can be realized by a translationally movable signal body with a readily visible signal surface, which illuminates, specularly reflects, or is provided with a color that contrasts with the environment, such as a neon color. For example, an acoustic display can be realized by a sound generator with a resonance space, in which a stream of air can flow to generate the sound, like a trumpet, a whistle, a siren or the like.

In an exemplary embodiment, the pneumatically operated display can also emit both a visually and acoustically perceivable signal or indication. The use of pneumatic energy for operating the display makes it possible to economize on electrical energy of the processing field device. In particular for safety-related reasons, the available pneumatic energy of a field device is often significantly greater than its available electrical energy, provided electrical energy is even available at all. In an exemplary embodiment, the electro-pneumatic actuator transmits a pneumatic display actuating signal to the display, which can differ from the pneumatic drive actuating signal. Given the structural ability to give the display actuating signal for the pneumatically operated display a different configuration, the display can show additional operating information, for example relating to the valve, instead of merely reproducing the drive pressure prevailing in the pneumatic drive.

In an exemplary embodiment, the pneumatic display actuating signal is allocated to some field device-specific operating information, e.g., a desired value, an actual value or a control value of the field device, in particular of a positioner of the valve, can be displayed as the operating information. For example, the operating information relates to the process to be controlled or regulated by the field device, such as a temperature, a pressure, a flow volume or the like, of the process fluid. Alternatively or additionally, the operating information relates to the position of the drive or valve. The operating information can also relate to a travel time, i.e., the time required for the valve to travel over a specific length and/or from a specific starting point to a specific end point. In an exemplary embodiment, operating information can also take the form of derived operating information ascertained based on a combination of different individual pieces of operating information, or a tendency involving a specific operating information that was ascertained proceeding from successive points in time, for example that can be minutes, hours, days or weeks apart, in particular a tendency relating to a travel time, wherein travel times relating to the same length are analyzed for several consecutive days.

In an exemplary embodiment, tendency-related or derived operating information can serve to indicate a level of wear or looming failure, and be displayed as a warning. By transmitting an individual pneumatic display actuating signal to the display, any operating information can be displayed using pneumatic energy, decoupled from the drive pressure or drive actuating signal. In particular, the pneumatically operated display can also alert an operator to the operating information from a greater distance away from the field device to be monitored. Several different pieces of operating information can also be identified, wherein a specific respective display signal is allocated to each operating information in advance. For example, the preset allocation can be differentiated via color allocation, contrasting or sound generation.

For example, a display actuating signal that differs from the pneumatic drive actuating signal for the pneumatic drive can be realized by using two or more I/P transducers, wherein a transducer serves exclusively for actuating the pneumatic drive, while the at least one additional I/P transducer generates at least one pneumatic display actuating signal, and in an exemplary embodiment, several display actuating signals.

In an exemplary embodiment, an information allocation in which the at least one pneumatic display actuating signal is allocated to a certain field device-specific operating information to generate the at least one pneumatic display actuating signal. In an exemplary embodiment, a microcomputer, in particular of a positioner of the field device, can be used to generate the signal. It is clear that various operating states of the field device can be allocated specifically to respective air pressures according to predetermined pneumatic display actuating signals.

In an exemplary embodiment, the variability between the display actuating signal and drive actuating signal realizable by the electro-pneumatic actuator can also be realized by an electro-pneumatic structuring, as indicated above, with different I/P transducers, or by an electronic circuit, for example a microcircuit.

In an exemplary embodiment, the electro-pneumatic actuator includes an electro-pneumatic display signal transducer for delivering the at least one pneumatic display actuating signal. The at least one pneumatic display actuating signal depends on the field device-specific operating information to which it is allocated. Aside from the electro-pneumatic display signal transducer, the electro-pneumatic actuator can have an electro-pneumatic drive signal transducer, for example which can emit one or more pneumatic drive actuating signals to the pneumatic drive, such as a single- or double-acting pneumatic drive, according to a regulating routine (desired value/actual value signal processing relative to the position of the final control element to be positioned).

In an exemplary embodiment, the electro-pneumatic actuator includes an electronic component for acquiring, receiving, delivering and/or generating the at least one field device-specific operating information. The electronic component, which determines when and how the display actuating signal is to be emitted, can simply receive the operating information to be displayed and trigger a display. The electronic component itself can also initiate the field device-specific operating information to be displayed. The electronic component is to be configured to deliver the field device-specific operating information to an I/P transducer, for example. In a case where the electronic component is responsible for regulation, it can itself generate the field device-specific operating information to be displayed. In an exemplary embodiment, the electronic component is structurally coupled with a pneumatically operated display in such a way as to initiate the output of the specific pneumatic display actuating signal.

In an exemplary embodiment, the electronic component is a microcontroller or microchip. In an exemplary embodiment, the microcontroller and/or microchip can include processor circuitry configured to perform the functions of the microcontroller/microchip. The electronic component can be connected with the electro-pneumatic display signal transducer and potentially with the electro-pneumatic drive signal transducer so as to transmit signals.

In an exemplary embodiment, the electro-pneumatic drive signal transducer and electro-pneumatic display signal transducer are connected in a row (e.g., in parallel) or in series with respect to pneumatic supply. In an exemplary embodiment, both transducers are connected with the same pneumatic source, in particular a compressed air source, such as a compressor and/or a pressurized air reservoir.

In an exemplary embodiment, the pneumatically operated display is exclusively pneumatically operated, in particular via the pneumatic drive actuating signal.

In an exemplary embodiment, the pneumatically operated display is configured to output two, three, four or more discrete visual and/or acoustic signals for respective field device-specific operating information. In combination or alternatively thereto, the electro-pneumatic actuator can exhibit two, three, four or more pneumatically operated displays for visually and/or acoustically displaying at least one field device-specific operating information.

In an exemplary embodiment, the electro-pneumatic actuator has a component module that is configured to be inserted into a modular slot of the field device, in particular of the positioner. The component module of the electro-pneumatic actuator is structured in such a way that it can accommodate the electro-pneumatic drive signal transducer and/or the electro-pneumatic display signal transducer or other transducers. In particular, the component module can be modularly configured to the modular slot in such a way that its electrical interfaces merge into each other when occupying the slot and/or that their pneumatic slots merge into each other when occupying the slot.

The present disclosure is also directed to a field device for a processing plant, such as a brewery, a petrochemical plant or the like. In an exemplary embodiment, the field device includes a final controlling device, such as a control valve, an emergency safety valve or the like, a pneumatic drive for positioning the final controlling device and an electro-pneumatic actuator according to the present disclosure for delivering a pneumatic drive actuating signal.

In an exemplary embodiment, the field device includes at least one modular slot for accommodating at least one component module, wherein the at least one modular slot is modularly configured to the at least one component module in such a way that the electrical interfaces merge into each other when occupying the slot and/or that the pneumatic interfaces merge into each other, in particular in an airtight manner, when occupying the slot.

The present disclosure is also directed to a method for delivering an operating signal, such as an emergency signal, relating to a field device of a processing plant, such as a brewery, a petrochemical plant or the like. In an exemplary embodiment, a pneumatic drive actuating signal is delivered to a pneumatic drive of the processing plant that actuates the final controlling device. A pneumatically operated display receives a pneumatic display actuating signal for its operation. The schematically operated display then generates a visual and/or acoustic operating signal. The display consumes at least part of the pneumatic energy of the pneumatic display actuating signal for generating the visual and/or acoustic operating signal. In an exemplary embodiment, the total pneumatic energy of the pneumatic display actuating signal is used.

In an exemplary embodiment, the pneumatic display actuating signal differs from the drive actuating signal, as already explained above.

In an exemplary embodiment, apart from the pneumatic energy of the pneumatic display actuating signal, no electrical energy, in particular no additional energy, is used by the display to generate the operating signal.

With reference to FIGS. 1-4, the field device is labeled with reference number 1. The field device 1 is equipped with an electro-pneumatic actuator, for example a positioner, an current/pressure (I/P) transducer, an I/P transducer array that includes several I/P transducers, electrical, electro-pneumatic or pneumatic amplifiers or the like.

In an exemplary embodiment, the field device 1 comprises a control valve 3, which is actuated or positioned by a pneumatic actuator 5, wherein the actuating power is conveyed by the pneumatic actuator 5 to the control valve 3 via an actuating lever or actuating shaft 7.

In an exemplary embodiment, the electro-pneumatic actuator of the field device 1 includes a pneumatically driven display 11, which can acoustically present and/or visually display at least one operating information of the field device 1. For example, the display 11 can output a signal for an operating information acoustically as a horn, whistle, siren or percussion signal, or visually by way of a single, multiple or continuous movement or positional change of a visual signal body, such as a colored, illuminated and/or reflecting signal body. For example, the signal body of the visual display can be a movable, in particular, translationally movable or rotationally movable, panel. In an exemplary embodiment, a visual display is an at least sectionally transparent hollow body, which is filled with different liquids. The transparent liquid or liquid of a specific color is visible in the transparent section, depending on the indicated pressure $p_H$ of the pneumatically actuated display 11. In an exemplary embodiment, the pneumatically driven display 11 includes processor circuitry configured to acoustically present and/or visually display at least one operating information of the field device 1.

In an exemplary embodiment, for display purposes, the display 11 receives a pneumatic display signal via a pneumatic display signal line 13 for transmitting the display signal. The pneumatic display signal pressure $p_H$ in the display signal line 13 can stem from the same pneumatic source (not shown) as the pneumatic actuating pressure $p_S$ of the pneumatic actuator 5 that produces the actuating power for actuating the control valve 3. However, it is also conceivable for the pneumatic actuator 5 and pneumatic display 11 to be supplied from functionally independent, structurally separate pneumatic sources.

In an exemplary embodiment, independently of the type of signal the pneumatically operated display 11 is configured to output, the energy used by the display 11 for displaying the display signal can be supplied to the display 11 in exclusively a pneumatic manner. In particular, the pneumatic display 11 can be free of an electrical energy supply. A display 11 supplied with energy completely or exclusively derived from pneumatic energy (i.e., air pressure) is advantageous in particular in an explosive area, since it completely eliminates the danger of explosions caused by the electrical voltage of display electronics.

In particular, a pneumatically operated display 11 can be designed in such a way as to output one of two, three or four discrete, predetermined visual and/or acoustic signals as a function of a supplied indicated pressure $p_H$. In particular, different colors or sounds are possible.

In an exemplary embodiment, a discrete signal output by the display 11 can take place by configuring the indicated pressure transducer 25 to prescribe one of two, three, four or more different discrete indicated signal pressures $p_H$ for the pneumatically operated display 11 as a function of the electrical indicated signal $e_H$. In an exemplary embodiment, alternatively or additionally, the electro-pneumatic actuator can generate several different pneumatic displays 11 for outputting different signals, i.e., different types of signals, or different signals of the same type, as described above. In particular, the display 11 can signal different discrete signals for a failure, normal operation, required maintenance or functional monitoring, i.e., currently performed maintenance, relating to the field device 1.

In exemplary embodiments shown in FIGS. 1 to 4 provide for a single pneumatic source for supplying both the pneumatic display 11 and the pneumatic actuator 5. In conventional processing plants, a compressor and/or compressed air reservoir as the pneumatic source provides a continuous supply of pneumatic energy at a supply pressure of 6 bar. The supply pressure is provided to the field device 1 by the pneumatic source through a pneumatic supply line 15.

In an exemplary embodiment, in order to supply the pneumatic actuator 5 with pneumatic energy or supply pressure $p_V$ from the supply line 15, the field device 1 includes an I/P transducer, which can be referred to as an actuating pressure transducer 21, and provides the pneumatic actuator 5 with a pneumatic actuating pressure $p_S$ for actuating the control valve 3.

In an exemplary embodiment, in order to control and/or regulate the control valve 3 using the pneumatic actuator 5, the field device 1 can exhibit a positioner 23. In an exemplary embodiment, the positioner 23 generates an analog or digital electrical actuating signal $e_S$. The analog or digital electrical actuating signal $e_S$ can correspond to the position of the control valve 3. The actuating pressure transducer 21 can be configured to change the pneumatic actuating pressure $p_S$ based on the analog or digital electrical actuating signal $e_S$.

In exemplary embodiments illustrated in FIGS. 1 to 4, the pneumatic actuator 5 can be a unilaterally acting drive. In operation, the actuating pressure $p_S$ causes the actuating rod or actuating shaft 7 to move in just one direction. Springs (not shown) preloaded against the acting direction of the pneumatic drive 5 cause the actuating rod or actuating shaft 7 to move in the opposite direction when the spring force exceeds the pneumatic actuating power.

In an exemplary embodiment, in which a pneumatically double-acting drive is provided for actuating the control valve 3, each chamber can include a separate actuating pressure transducer so that the chambers act oppositely. A pressure gradient between the chambers then produces the actuating power for the control valve. For the sake of simplicity, however, only one field device 1 with a unilaterally acting actuator will continue to be described below.

In an exemplary embodiment, the field device 1 includes an additional electro-pneumatic transducer or I/P transducer, which can be referred to as an indicated pressure transducer 25, for providing the pneumatic indicated signal pressure $p_H$ in the pneumatic display signal line 13 for the pneumatically operated display 11. The indicated pressure transducer 25 receives an electrical indicated signal $e_H$ from the positioner 23, and, based on the electrical indicated signal, outputs the pneumatic indicated signal or indicated signal pressure $p_H$ for the display 11. With respect to the supply pressure $p_V$, the actuating pressure $p_s$ and indicated signal pressure $p_H$, pressure losses along the respective pressurized line may be regarded as negligible as concerns the function of the electro-pneumatic actuator.

In an exemplary embodiment, auxiliary signal electronics for generating an electrical indicated signal $e_H$ can be provided. The auxiliary signal electronics can be structurally separate and/or functionally independent of the positioner 23 for generating the actuating signal $e_S$. However, as depicted on FIG. 4, the field device 1 can include only one microcontroller 24, which provides both the electrical control signal $e_S$ as well as the electrical indicated signal $e_H$ for the two I/P transducers, actuating pressure transducer 21 and indicated pressure transducer 25. In an exemplary embodiment, the field device 1 can include more than one microcontroller 24. In an exemplary embodiment, the microcontroller 24 includes processor circuitry configured to perform the functions of the microcontroller 24.

In an exemplary embodiment, the positioner 23 can exhibit several inputs and outputs for different input variables or output variables. In addition to the output variables indicated signal $e_H$ and actuating signal $e_S$, the positioner 23 can also deliver other control and/or regulating signals, for example an electrical pilot control signal $e_E$ for an electrical pilot stage 27.

In an exemplary embodiment, additionally or alternatively to an electrical pilot signal $e_W$, for example, from a control room of the processing plant, the positioner 23 can receive input signals, such as an emergency signal or sensor signal, which relate to the field device 1, for example, a sensor signal from a path or position sensor 31 that indicates the position of the actuating rod 7 or actuating shaft and the control valve 3 connected therewith. In this example, such input signals can also be provided for the indicating electronics. Sensor signals can also involve the process actuated or regulated by the field device 1, in particular a process fluid, for example its temperature or pressure. A positioner 23 with a microcontroller 24 can also consider the time as an input variable. Instead of a microcontroller 24, the electronic component can comprise a microprocessor, if necessary with a separate memory and/or an electrical circuit, such as an analog circuit.

In an exemplary embodiment, the electrical indicated signal $e_H$ can prompt the display 11 to deliver a visual or acoustic indication or signal if a specific operating information for the field device 1 arises, for example, if a threshold relating to a pressure, temperature valve position or the like drops below a minimum value, exceeds a maximum value or ranges between two specific limiting values (e.g., a lower limiting value and an upper limiting value). However, the display 11 can even then be actuated by means of a corresponding indicated signal pressure $p_H$ in the event of a departure from a specific operating state, for example if an operating information is omitted, e.g., given a failure of the energy supply of the field device 1 or a failure of the pneumatic supply energy of the pneumatic actuator 5 (such as when the pneumatic supply energy $p_V$ for the pneumatic actuator 5 drops below a minimum pressure).

Figure 1:
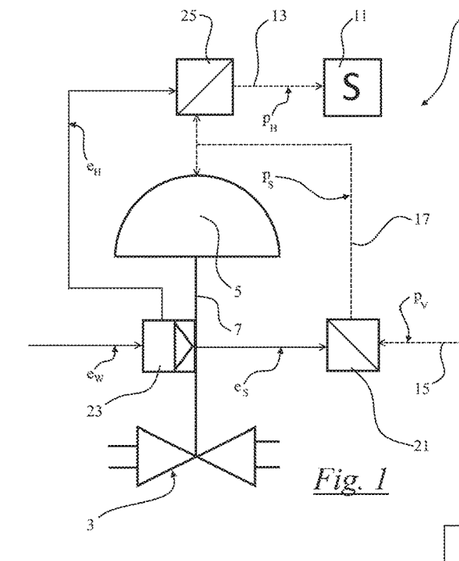
FIG. 1 illustrates a schematic drawing of a field device with an electro-pneumatic actuator according to an exemplary embodiment of the present disclosure.

In the exemplary embodiment shown in FIG. 1, the indicated pressure transducer 25 derives pneumatic energy from the actuating pressure line 17, which provides the actuating pressure $p_S$ to the pneumatic actuator 5 via the actuating pressure transducer 21. Since the pneumatic energy for generating the indicated signal using the pneumatically operated display 11 is generally less in relation to the energy of the pneumatic drive energy applied by the pneumatic actuator 5 for actuating the control valve 3, regulating the pneumatic actuator 5 by having the indicated pressure transducer 25 tap the indicated pressure is only slightly impaired, if at all. In the embodiment according to FIG. 1, the indicated pressure $p_H$ can at most be as high as the actuating pressure $p_S$. In the embodiment according to FIG. 1, the supply line 15, actuating pressure line 17 and display signal line 13 are connected in series.

Figure 2:
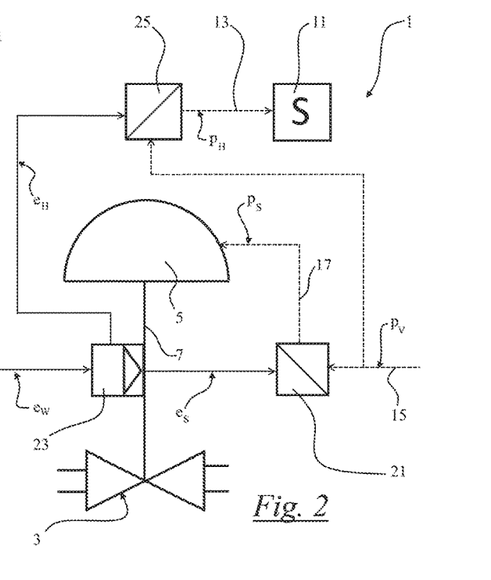
FIG. 2 illustrates a schematic drawing of a field device with an electro-pneumatic actuator according to an exemplary embodiment of the present disclosure.

By contrast, in an exemplary embodiment shown in FIG. 2, the indicated signal pressure $p_H$ is tapped directly from the supply line 15 by the indicated pressure transducer 25 and fed into the display signal line 13, so as to actuate the display 11. As shown in FIG. 2, the actuating pressure transducer 21 also taps the pneumatic actuating pressure $p_S$ for the actuating pressure line 17 from the pneumatic supply line 15 for actuating the pneumatic actuator 5. As a result, pneumatic display signal lines 13 and pneumatic actuating pressure lines 17 are parallel to each other in the embodiment depicted on FIG. 2. Both the actuating pressure $p_S$ and the indicated signal pressure $p_H$ can independently of each other be at most as high as the supply pressure $p_V$ from which they are fed.

Generally, the swelling volume that provides the pneumatic supply pressure $p_V$ is very high, thereby realizing an essentially independent pneumatic actuation of the two components given a parallel arrangement of the pneumatic display 11 and pneumatic actuator 5 according to FIG. 2. For this reason, such an embodiment may be advantageous if the pneumatic power consumption by the pneumatic actuator 5 and pneumatic display 11 lie roughly at the same order of magnitude, for example, if an especially powerful display 11 and/or a pneumatic actuator 5 with especially small dimensions is provided.

In addition, tapping the actuating pressure $p_S$ with the actuating pressure transducer 21 and the indicator signal pressure $p_H$ with the indicator pressure transducer 25 directly from the respective supply line 15 also ensures that the supply of compressed air to the display 11 is not impaired during an emergency venting of the pneumatic actuator 5 as the result of a processing error or the like, and a resultant emergency venting of the actuating pressure line 17. Expressed differently, the pneumatic supply to the pneumatic display 11 and pneumatic drive 5 are decoupled from each other in the embodiment shown in FIG. 2 in such a way that, when venting one line, the other line is not vented. As is clear, "venting" results in a pressure in the vented line that roughly corresponds to atmospheric pressure, or at least lies significantly below the supply pressure $p_V$. Therefore, pneumatically decoupling the display 11 and drive 5 allows the display 11 to deliver a signal, such as an emergency signal, in particular even while venting the actuator 5.

Figure 3:
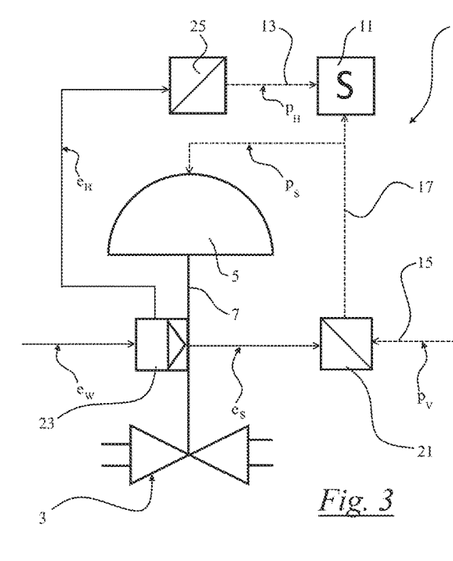
FIG. 3 illustrates a schematic drawing of a field device with an electro-pneumatic actuator according to an exemplary embodiment of the present disclosure.

The origin of the pneumatic supply pressure for the indicated pressure transducer 25 and the pneumatically operated display 11 resultantly supplied via the pneumatic display signal line 13 is not shown. Turning to FIG. 3, in an exemplary embodiment, the indicated signaling pressure transducer 25 can derive pneumatic energy from the actuating pressure $p_S$ of the pneumatic drive 5, as also shown in FIG. 1. However, the indicated pressure transducer 25 according to FIG. 3 is pneumatically supplied by a supply directly from the pneumatic supply line 15, as depicted on FIG. 2, or from a pneumatic supply line (not shown) from another source. As a result, actuation of the display 11 is pneumatically independent of the actuating pressure transducer 21 of the pneumatic drive 5, or even of the entire supply pneumatics of the pneumatic actuator 5.

In an exemplary embodiment, with reference to FIG. 3, the pneumatically operated display 11 is provided with both an indicated signal pressure $p_H$ defined by the indicated pressure transducer 25 and the actuating pressure $p_S$ of the pneumatic actuator 5. In this way, the display output of the pneumatically actuated display 11 depends both on the actuating pressure $p_S$ and the indicated signal pressure $p_H$. Just like a logical AND module, the pneumatically actuated display 11 can then display a specific operating state if both lines 13 and 17 are exposed to a specific pressure (greater than the ambient pressure). However, the pneumatic display 11 according to FIG. 3 can, in particular, also be designed in such a way that a visual and/or acoustic emergency signal is displayed if no pressure (i.e., the ambient pressure) is applied to both lines, the display signal line 13 and actuating pressure line 17, or only to one of the two lines, the display signal line 13 or actuating pressure line 17. A pneumatically redundant emergency signal display is realized in this way.

Figure 4:
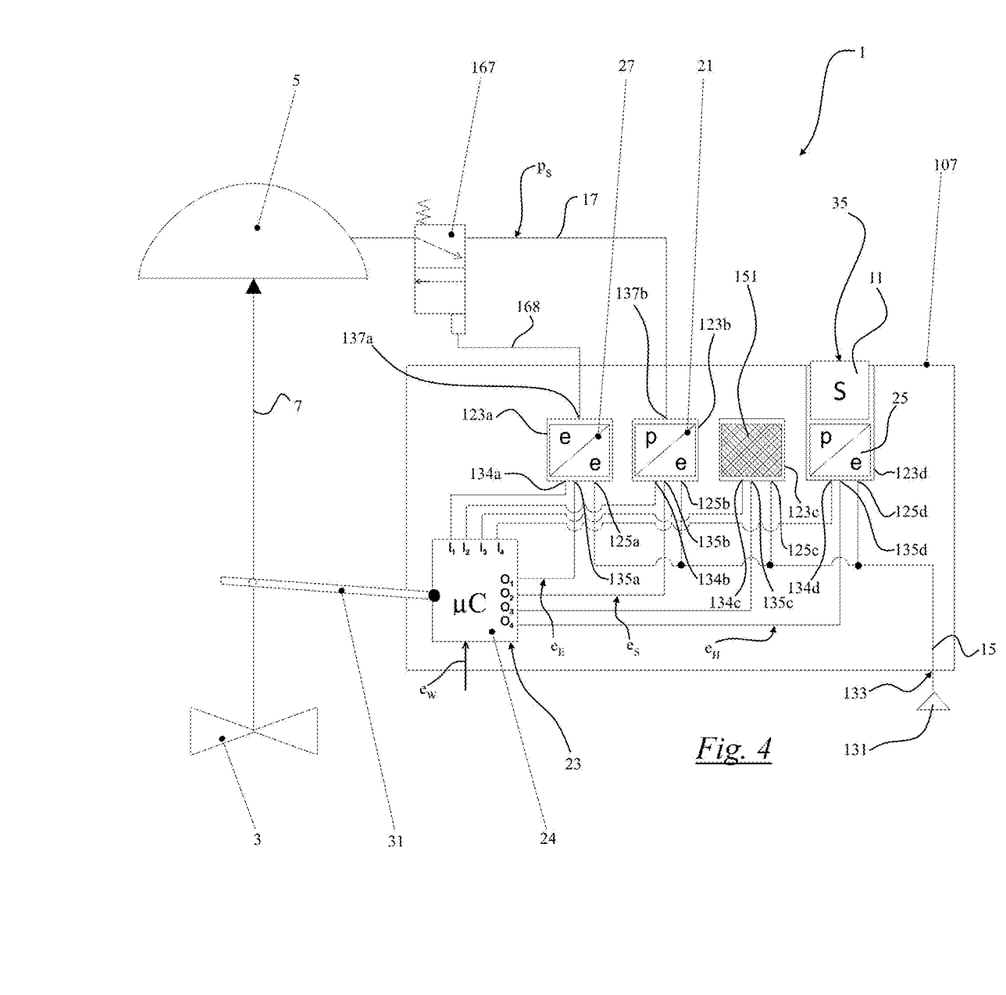
FIG. 4 illustrates a field device with an electro-pneumatic actuator according to an exemplary embodiment of the present disclosure.

An exemplary embodiment of a modularly constructed field device 1 is shown with reference to FIG. 4. In an exemplary embodiment, the modularly constructed field device 1 can also be equipped with the electro-pneumatic actuator of the present disclosure. The basic structure and function of a modular field device system is described in German Patent Applications DE 10 2012 021 387 and DE 10 2012 021 388, each of which is incorporated herein by reference in its entirety.

In an exemplary embodiment, the field device 1 shown in FIG. 4 has a current-pressure transducer or an I/P transducer array with a pneumatic field input 133, at which the pneumatic supply line 15 fed with pneumatic supply pressure $p_V$ from the supply source 131 enters into the current-pressure transducer 107. In an exemplary embodiment, the current-pressure transducer 107 further has four slots or plug-in locations 123a, 123b, 123c, 123d, which essentially have the same structural design and are freely accessible from outside of the current-pressure transducer 107. The slots or plug-in locations 123a, 123b, 123c, 123d can optionally be configured with four individual modular electronic building blocks of varying types.

In an exemplary embodiment, the slot or plug-in location 123d has inserted into it a display module 35, which can include an indicated pressure transducer 25 and a pneumatic display 11 that is operably pneumatically connected with the indicated pressure transducer 25. With the display module 35 operably inserted into the slot or plug-in location 123d, the signal-emitting part of the pneumatically actuated display 11 is arranged in such a way relative to the current-pressure transducer 7 and display module 35, in particular the respective casing, that an acoustic and/or visual signal delivered by the display 11 can be perceived. To this end, for example, a visual display of the kind schematically depicted on FIG. 4 can protrude over the casing of the current-pressure transducer 7 so as to be visible to operating personnel. An acoustic display need not necessary be visible from outside the casing of the current-pressure transducer (or the casing of the display module 35), as long as it is ensured that the acoustic signal of the acoustic display 11 noticeably drowns out ambient noises of the operating field device 1.

Examples of possible additional modular electronic modules include an I/P transducer, like the actuating pressure transducer 21, a data memory, a pneumatically operated current generator, a microprocessor 24 and/or an electronic switch, like the electrical pilot stage 27. Further, modular electronic modules of the same type having different operating modes or performance parameters can also be inserted into the slots. In an exemplary embodiment, the slots 123a to 123d are modularly adapted in such a way that, depending on which predetermined modular electronic module is inserted, the function of the electronic module is ensured by establishing electrical and/or pneumatic communication lines to the respective other components.

In an exemplary embodiment, the slots 123a to 123d have a pneumatic interface 125a to 125d, which is connected with the supply line 15, as well as electrical input interfaces 135a to 135d, which are connected with the microprocessor 23, along with output interfaces 134a to 134d. In an exemplary embodiment, each slot 123a can additionally have an output interface 137a, 137b (output interfaces of the slots 123c and 123d are not shown), by way of which output signals of an electrical or pneumatic nature of any type of modular electronic module can be delivered.

In an exemplary embodiment, and with reference to FIG. 4, the actuating pressure transducer 21 and indicated pressure transducer 25 are pneumatically supplied in essentially the same way as in the embodiment described above and depicted in FIG. 2, in which the actuating pressure transducer 21 and indicated pressure transducer 25 receive the supply pressure $p_V$ of the pneumatic supply line 15. The exemplary embodiment shown in FIG. 4 can include the emergency vent valve, which can be realized as a solenoid valve 167, or alternatively (not shown) as a pneumatically activated quick vent valve. A pneumatically activated quick vent valve would deliver a pneumatic pilot stage instead of an electrical pilot stage 27 so as to output an emergency vent signal to the emergency vent valve by way of an emergency signal line 168.

In an exemplary embodiment, the modular electronic or electro-pneumatic module inserted in any slot 123a to 123c can also be another component of the current-pressure transducer, such as the microprocessor 23, a data memory, a radio module or, for example, an electrical circuit for communicating with external electrical building components. In an exemplary embodiment, a blank module 151 can be provided for a slot 123c in the current-pressure transducer 107, which contains neither an electronic nor a pneumatic component, but essentially serves only to mechanically cover a non-functional, occupied slot.

DE 10 2012 021 387 and DE 10 2012 021 388 also describe the communication process between the microcontroller 24 and individual electronic and/or electro-pneumatic modular building blocks via their interfaces 134a to 134d and 135a to 135d.

In an exemplary embodiment, a second pneumatically activated display 11 with an accompanying (second) indicated pressure transducer can be provided, which supplies a (second) indicator signal pressure to the additional (second) display that differs from the actuating pressure $p_S$ for operating the pneumatic drive 5 as well as the indicated signal pressure $p_H$ for operating the (first) pneumatically operated display 11.

For example, a second display module (not shown) could be provided instead of the blank module 151 depicted on FIG. 4. In this way, for example, pneumatically redundant signals could be generated or various pneumatic signal displays for different signal types (visual or acoustic) or various signals of the same type (e.g., sounds varying in pitch) could be provided, e.g., for different field device-specific operating information.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory
(ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 Field device
2 Control valve
5 Actuator
7 Actuating rod/actuating shaft
11 Display
13 Display signal line
15 Supply line
17 Actuating pressure line
21 Actuating pressure transducer
23 Positioner
24 Microcontroller/microprocessor
25 Indicated pressure transducer
27 Pilot stage
31 Path or position sensor
35 Display module
107 Current-pressure transducer
131 Supply source
133 Field input
123a, 123b, 123c, 124d Slot or plug-in location
125a, 125b, 125c, 125d Pneumatic input interface
134a, 134b, 134c, 134d Output interface
135a, 135b, 135c, 135d Electrical input interface
167 Solenoid valve
eE Control signal
eH Indicated signal
eS Actuating signal
eW Pilot signal
pH Indicated pressure
pS Actuating pressure
pV Supply energy

What is claimed is:

1. An electro-pneumatic actuator of a field device of a processing plant, comprising:
    a pneumatically operated display configured to visually display or acoustically present at least one field device-specific operating information; and
    an electro-pneumatic display signal transducer configured to output and deliver at least one pneumatic display actuating signal to the pneumatically operated display based on the field device-specific operating information,
    wherein the electro-pneumatic actuator is configured to output at least one pneumatic drive actuating signal to a pneumatic drive to set a final controlling device of the field device.

2. The electro-pneumatic actuator according to claim 1, further comprising:
    an electro-pneumatic drive signal transducer configured to output and deliver the at least one pneumatic drive actuating signal.

3. The electro-pneumatic actuator according to claim 2, further comprising a positioner configured to:
acquire, receive, deliver, or generate the field device-specific operating information.

4. The electro-pneumatic actuator according to claim 3, wherein the positioner comprises at least one of a microcontroller, a microprocessor, and an electrical circuit.

5. The electro-pneumatic actuator according to claim 3, wherein the positioner is connected with the electro-pneumatic display signal transducer and the electro-pneumatic drive signal transducer in a signal transmitting configuration.

6. The electro-pneumatic actuator according to claim 2, wherein the electro-pneumatic drive signal transducer and electro-pneumatic display signal transducer are connected in parallel with a same pneumatic source.

7. The electro-pneumatic actuator according to claim 2, wherein the electro-pneumatic drive signal transducer and electro-pneumatic display signal transducer are connected in series with a same pneumatic source.

8. The electro-pneumatic actuator according to claim 2, wherein the field device includes a modular slot configured to accept a component module configured to be insertable in the modular slot.

9. The electro-pneumatic actuator according to claim 8, wherein the component module is the electro-pneumatic drive signal transducer or the electro-pneumatic display signal transducer.

10. The electro-pneumatic actuator according to claim 8, wherein the component module is modularly configured to the modular slot such that at least one of:
electrical interfaces of the component module and the modular slot electrically connect to each other when the component module occupies the slot, and
pneumatic interfaces of the component module and the modular slot pneumatically connect to each other when the component module occupies the slot.

11. The electro-pneumatic actuator according to claim 1, wherein the pneumatically operated display is exclusively operated pneumatically via the at least one pneumatic display actuating signal.

12. The electro-pneumatic actuator according to claim 1, wherein the pneumatically operated display is configured to output two or more discrete visual or acoustic signals corresponding to respective ones of the field device-specific operating information.

13. The electro-pneumatic actuator according to claim 1, wherein the electro-pneumatic actuator includes at least another pneumatically operated display configured to visually display or acoustically present one of the at least one field device-specific operating information.

14. The electro-pneumatic actuator according to claim 1, wherein the field device-specific operating information comprises: a drive position, a valve position, or a regulating variable.

15. The electro-pneumatic actuator according to claim 1, wherein the final controlling device is a control valve.

16. The electro-pneumatic actuator according to claim 1, wherein the at least one pneumatic display actuating signal is different from the at least one pneumatic drive actuating signal.

17. A field device of a processing plant comprising:
a final controlling device;
a pneumatic drive configured to position the final controlling device based on a pneumatic drive actuating signal; and
an electro-pneumatic actuator that includes:
a pneumatically operated display configured to visually display or acoustically present at least one field device-specific operating information based on a pneumatic display actuating signal, and
an electro-pneumatic display signal transducer configured to output and deliver the pneumatic display actuating signal to the pneumatically operated display based on the field device-specific operating information,
wherein the electro-pneumatic actuator is configured to output the pneumatic drive actuating signal to the pneumatic drive to position the final controlling device.

18. The field device according to claim 17, further comprising at least one modular slot configured to receive at least one component module, wherein the at least one modular slot is modularly adjusted to the at least one component module such that at least one of:
electrical interfaces of the at least one component module and the at least one modular slot electrically connect to each other when the at least one component module occupies the slot, and
pneumatic interfaces of the at least one component module and the at least one modular slot pneumatically connect to each other when the at least one component module occupies the slot.

19. A method for delivering an operating signal relating to a field device of a processing plant, comprising:
delivering a pneumatic drive actuating signal to a pneumatic drive of the processing plant to actuate a final controlling device of the field device;
generating, by an electro-pneumatic display signal transducer, a pneumatic display actuating signal based on field device-specific operating information;
receiving, by a pneumatically operated display, the pneumatic display actuating signal; and
generating, by the pneumatically operated display, at least one of a visual operating signal and an acoustic operating signal based on the pneumatic display actuating signal,
wherein the pneumatically operated display consumes at least part of a pneumatic energy of the pneumatic display actuating signal to generate the visual operating signal or the acoustic operating signal, and
wherein the pneumatic display actuating signal is different from the pneumatic drive actuating signal.

20. The method according to claim 19, wherein the pneumatically operated display is exclusively powered by the pneumatic energy of the pneumatic display actuating signal.

* * * * *